US012579037B2

(12) United States Patent
Rowlands et al.

(10) Patent No.: US 12,579,037 B2
(45) Date of Patent: Mar. 17, 2026

(54) INTELLIGENT ARRAY IO PATH MANAGEMENT

(71) Applicant: Dell Products L.P., Round Rock, TX (US)

(72) Inventors: Scott Rowlands, Cumming, GA (US); Krishna Deepak Nuthakki, Bangalore (IN); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/770,948

(22) Filed: Jul. 12, 2024

(65) Prior Publication Data

US 2026/0017142 A1    Jan. 15, 2026

(51) Int. Cl.
*G06F 11/00* (2006.01)
*G06F 11/07* (2006.01)
*G06F 11/14* (2006.01)
*G06F 11/30* (2006.01)

(52) U.S. Cl.
CPC ...... *G06F 11/1423* (2013.01); *G06F 11/0757* (2013.01); *G06F 11/079* (2013.01); *G06F 11/3041* (2013.01)

(58) Field of Classification Search
CPC .......................... G06F 11/1423; G06F 11/3041
See application file for complete search history.

(56) References Cited

U.S. PATENT DOCUMENTS

| | | | |
|---|---|---|---|
| 2016/0117215 A1* | 4/2016 | Gadelrab | G06F 13/4022 714/56 |
| 2016/0306722 A1* | 10/2016 | Zou | G06F 11/3027 |
| 2020/0089536 A1* | 3/2020 | Sumangala | G06F 3/0662 |
| 2021/0373796 A1* | 12/2021 | Matosevich | G06F 3/0689 |
| 2022/0100394 A1* | 3/2022 | Rajapa | G06F 3/0659 |
| 2022/0137830 A1* | 5/2022 | Garrett, Jr. | G06F 11/0772 714/6.2 |
| 2022/0237091 A1* | 7/2022 | Nuthakki | G06F 11/3409 |

OTHER PUBLICATIONS

Oracle, SCSI Reference Guide (Year: 2022).*

* cited by examiner

*Primary Examiner* — Bryce P Bonzo
*Assistant Examiner* — Gabriella Kanani Shelton
(74) *Attorney, Agent, or Firm* — Krishnendu Gupta; Nikhil Patel

(57) ABSTRACT

One or more aspects of the present disclosure relate to dynamically managing input/output (IO) paths in a storage network environment. In embodiments, IO operations received at a storage array port are monitored. For example, the storage array can receive the IO operations from one or more hosts. In addition, a number of failing IO operations at the port of the storage array is determined. Accordingly, an error in a communication path between the port of the storage array and at least one of the one or more hosts is identified based on the number of failing IO operations. Further, IO operations from the communication path with the error are redirected to an alternative communication path free from errors.

20 Claims, 5 Drawing Sheets

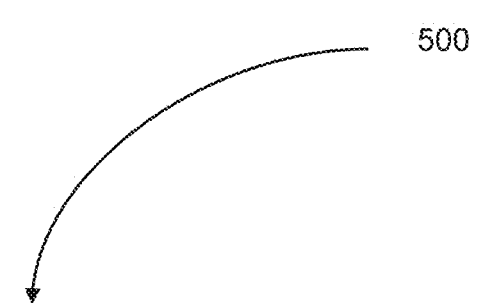

500

502
monitoring input/output (IO) operations received at a port of a storage array 504
determining a number of failing IO operations at the port of the storage array 506
identifying an error in a communication path between the port of the storage array and at least one of the one or more hosts based on the number of failing IO operations 508
redirecting IO operations from the communication path with the error to an alternative communication path free from errors

FIG. 5

INTELLIGENT ARRAY IO PATH MANAGEMENT

BACKGROUND

A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to bank account deposits/withdrawals. For example, an ATM can transmit input/output (IO) operations to update an account holder's bank account information. The management of IO operations, as facilitated by the method, is of utmost importance for maintaining system performance and reliability. Storage arrays typically interface with multiple hosts (e.g., ATMs) through various communication paths facilitated by ports. These systems, powered by robust and advanced Multi-Path I/O (MPIO) technologies, manage the paths through which data is transmitted to and from storage arrays, ensuring seamless and reliable data flow.

SUMMARY

One or more aspects of the present disclosure relate to dynamically managing input/output (IO) paths in a storage network environment. In embodiments, IO operations received at a storage array port are monitored. For example, the storage array can receive the IO operations from one or more hosts. In addition, a number of failing IO operations at the port of the storage array is determined. Accordingly, an error in a communication path between the port of the storage array and at least one of the one or more hosts is identified based on the number of failing IO operations. Further, IO operations from the communication path with the error are redirected to an alternative communication path free from errors.

In embodiments, whether the number of failing IO operations exceeds a port-level threshold can be determined.

In embodiments, a number of failing IO operations per Host Bus Adapter (HBA) corresponding to each of the one or more hosts can be determined.

In embodiments, a subject HBA can be determined as the source of the error if the number of failing IO operations of the subject HBA exceeds an HBA threshold.

In embodiments, the port of the storage array can be determined as the source of the error if the number of failing IO operations exceeds a port-level threshold and the number of failing IO operations per HBA fails to exceed the HBA threshold.

In embodiments, the one or more hosts can be caused to poll the port of the storage array at regular intervals to receive a health status of the port.

In embodiments, the one or more hosts can be caused to use a vendor unique (VU), mode sense, or log sense command to poll the port of the storage array.

In embodiments, an IO performance of the port of the storage array can be reduced to redirect IO operations to another port of the storage array.

In embodiments, response times for IO operations received at the port of the storage array can be increased to reduce the IO performance.

In embodiments, at least one of the one or more hosts can be caused to load balance IO operations to the other port of the storage array by reducing the IO performance of the port of the storage array.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

FIG. 2 is a block diagram of a communications network in accordance with embodiments of the present disclosure.

FIG. 5 is a flow diagram of a method for dynamically managing input/output (IO) paths in a storage network environment per embodiments of the present disclosure.

DETAILED DESCRIPTION

Figure 1:
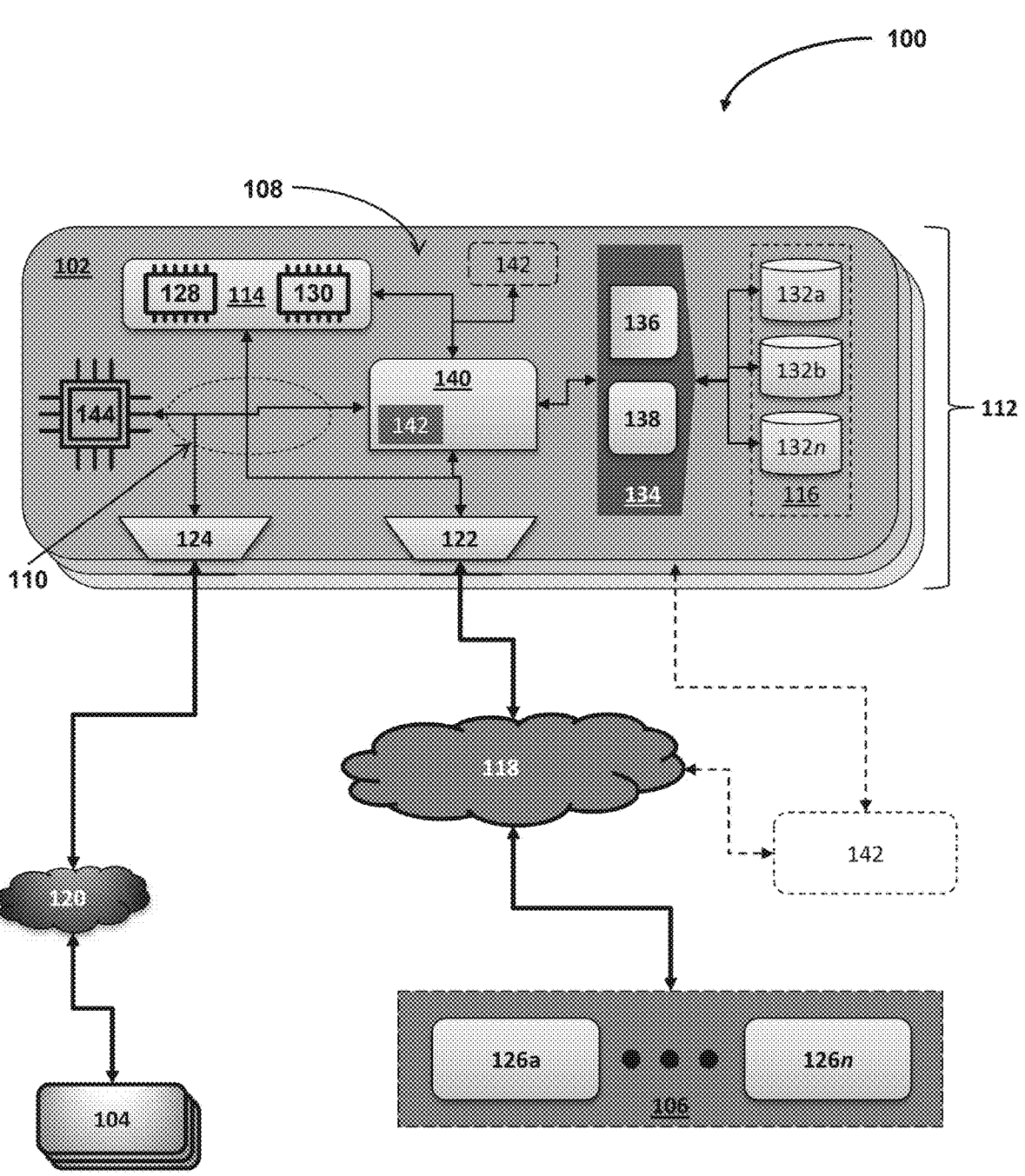
FIG. 1 illustrates a distributed network environment in accordance with embodiments of the present disclosure.

A business like a financial or technology corporation can produce large amounts of data and require sharing access to that data among several employees. Such a business often uses storage arrays to store and manage the data. Because a storage array can include multiple storage devices (e.g., hard-disk drives (HDDs) or solid-state drives (SSDs)), the business can scale (e.g., increase or decrease) and manage an array's storage capacity more efficiently than a server. In addition, the business can use a storage array to read/write data required by one or more business applications.

In modern data storage systems, particularly those utilizing storage arrays, efficiently managing input/output (IO) operations is crucial for maintaining optimal performance and reliability. These systems often employ Multi-Path I/O (MPIO) technology, which allows IO operations to be distributed across multiple physical paths, enhancing throughput and providing redundancy to safeguard against path failures.

A significant challenge in effectively managing these paths is the degradation of laser diodes, critical components in the fiber optic communication used in storage arrays. Over time, the power output of laser diodes naturally diminishes, which can lead to intermittent and unpredictable transmission errors. These errors often manifest as "flaky" paths—unreliable communication links due to increased error rates.

Traditional systems determine path reliability by monitoring the failure rates of IO operations per host. However, this method can be inadequate in configurations where multiple hosts are connected to a single port of a storage array. Individual hosts might not encounter enough IO failures to reach the predefined threshold for identifying an unreliable path. This can result in the continued use of defective paths, leading to degraded performance, increased risk of data loss, and inefficient use of system resources.

The limitations of current path error detection methods, compounded by the natural degradation of laser diodes, underscore the need for advancements in how storage systems manage and diagnose path reliability. As storage array environments become more complex and the demand for uninterrupted data access grows, developing more sophisticated path management solutions becomes increasingly critical.

Embodiments of the present disclosure introduce novel techniques that enhance the detection and management of path reliability in storage arrays. These techniques particularly address the issues arising from the degradation of laser diodes and the limitations of current Multi-Path I/O (MPIO) technologies.

For example, the embodiments introduce innovative techniques for monitoring and analyzing input/output (IO) operations at the storage array port level rather than solely at individual host levels. By aggregating IO error data across all connected hosts, the system can more accurately identify problematic paths that might not meet traditional per-host error thresholds. This port-level error detection is crucial in environments with high host connectivity, where individual host data might not sufficiently indicate the health of the overall communication path.

Furthermore, the embodiments introduce dynamic response techniques that identify flaky paths and actively manage them by redirecting IO operations to alternative paths. This proactive approach involves adjusting the port's performance characteristics, such as reducing its IO throughput, to encourage connected hosts to reroute traffic through alternative, error-free paths. This method ensures continued data integrity and system performance while minimizing the impact of failing paths.

Additionally, the embodiments incorporate a communication protocol that allows the storage array to report path health status directly to connected hosts. This feature enables hosts to adjust their path usage in real time, enhancing the overall resilience and efficiency of the storage network.

By addressing the fundamental shortcomings of existing path management techniques and introducing a robust mechanism for real-time path optimization, the embodiments represent a significant advancement in the field of storage array technology. Specifically, the embodiments substantially improve data storage systems' reliability, performance, and operational efficiency, particularly in complex and high-demand environments.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110, such as fibre channels, buses, and communication modules that communicatively couple the components 108. Further, the distributed network environment 100 can define an array cluster 112, including the storage array 102 and one or more other storage arrays.

In embodiments, the storage array 102, components 108, and remote system 104 can include a variety of proprietary or commercially available single or multi-processor systems (e.g., parallel processor systems). Single or multi-processor systems can include central processing units (CPUs), graphical processing units (GPUs), and the like. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. The communication nodes can also include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126a-n, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multi-processor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132a-n. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that control access to the array's persistent storage 116 (e.g., storage devices 132a-n).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126a-n) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, processing, storage, and memory resources as described in greater detail herein.

Figure 2:
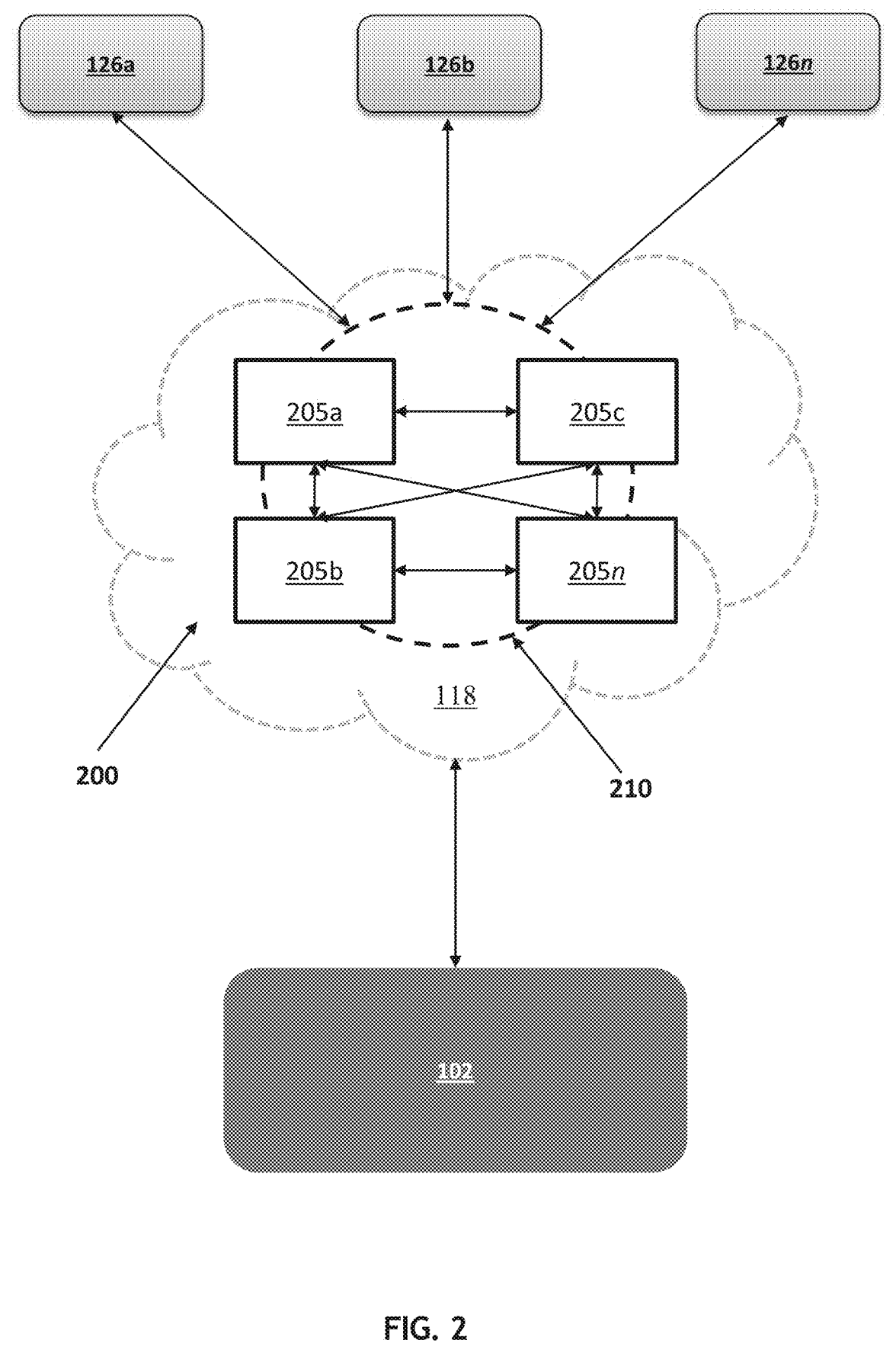

Regarding FIG. 2, a network (e.g., a SAN) 118 can include one or more interconnected nodes 205a-n that define a structure and flow of information between devices on the SAN 118 (network devices). For example, the SAN 118 can interconnect the nodes 205a-n using links 210. The links 210 allow the nodes 205a-n to exchange messages using one or more communications protocols. The communications protocols can define a method (e.g., rules, syntax, semantics, and the like) by which the nodes 205a-n can pass messages and signals to other networked devices. Further, the protocol can define a communications synchronization process and error recovery methods. The SAN 118 can implement the protocol using hardware, software, or a combination of both. The protocol's rules, syntax, and semantics can include, e.g., a circuit switching, message switching, or packet switching technique. In embodiments, the nodes 205a-n can comprise networking hardware such as computing nodes (e.g., computers), servers, networking hardware, bridges, switches, hubs, etc.

The SAN 118 can arrange the nodes 205a-n to define one or more of a Chain Network (CHN), Y-Network (YN), Wheel Network (WN), Circle Network (CIRN), All-Channel Network (ACN) such as a Star Network, and the like. In a CHN, the nodes 205a-n have a hierarchical relationship (e.g., topology) that requires communications to flow through a formal chain. In a YN, the nodes 205a-n have a topology resembling an upside-down 'Y' (e.g., information flows upward and downward through the hierarchy). In a WN, data flows to and from a networked device (e.g., array 105). In a CIRN, the nodes 205a-n have a topology that restricts the flow of information to/from one node of the nodes to an adjacent node (e.g., a neighboring node). In embodiments, each node can have at most two adjacent nodes. In an ACN, the nodes 205a-n have a structure that allows communications to flow upward, downward, and laterally among each node. As illustrated, the SAN 118 can have an arrangement 200 consistent with an ACN. In embodiments, the SAN 118 can define one or more communication paths (e.g., paths 305a-n of FIG. 3) between the array 105 and the host machines 126a-n, as described in greater detail herein.

Figure 3:
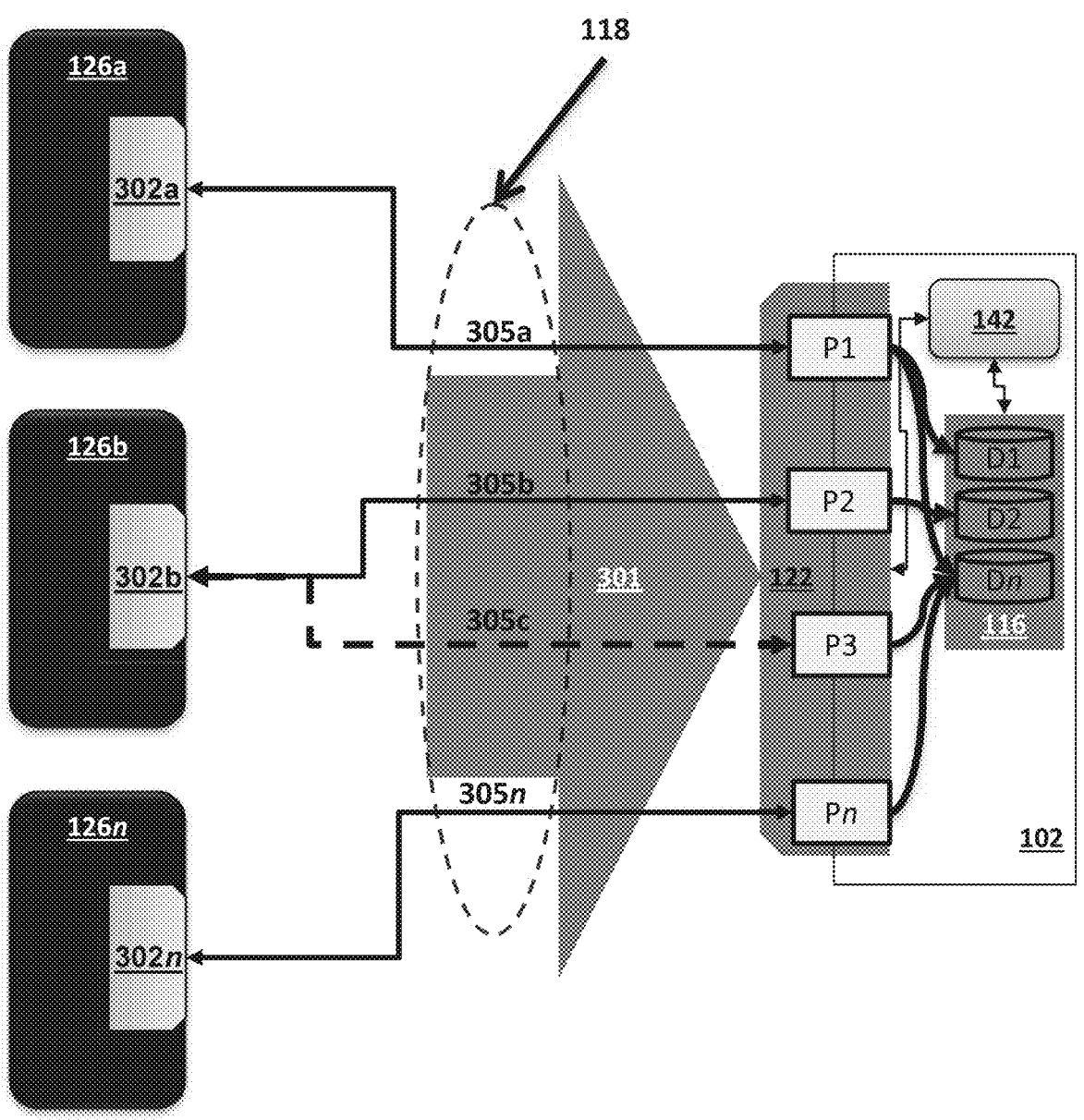
FIG. 3 is a block diagram of logical communication paths over a communications network in accordance with embodiments of the present disclosure.

Regarding FIG. 3, in a storage array environment (e.g., the environment 100 of FIG. 1), hosts 126a-n can send input/output (IO) operations in an IO workload 301 to a storage array 102 through a structured and systematic process that involves host bust adapters (HBAs) 302a-n, communication paths 305a-n, and ports P1-n on a host adapter (HA) 122 of the storage array 102. For example, the IO operations can include read/write requests requesting access to data stored on one or more storage devices D1-n corresponding to the storage array's persistent storage 116.

In embodiments, the hosts 126a-n are equipped with respective HBAs 302a-n that connect them to, e.g., a storage area network (SAN) 118. Accordingly, the HBAs 302a-n act as interfaces between the hosts 126a-n and the SAN 118, specifically designed to manage IO operations with external storage devices like the storage array 102. For example, the HBAs 302a-n can be dedicated hardware cards or integrated circuits, connecting the hosts 126a-n to the SAN 118 using protocols such as Fibre Channel, ISCSI, or SAS (Serial-attached Small Computer System Interface (SCSI))

When the hosts 126a-n need to communicate with the storage array 102, they establish logical connections through their respective HBAs 302a-n to one or more of the storage array's ports P1-n. This involves discovering available storage resources and the paths that can be used to access those resources. In environments using Fibre Channel, this process might involve zoning and LUN masking, which are configurations on network switches (e.g., the network nodes 205a-n of FIG. 2) and the storage array 102 to ensure secure and specific access.

For example, in Fibre Channel networks, the HBAs 302a-n can discover the paths 305a-n through Fabric Login (FLOGI) techniques. This involves communicating with fabric services to register each host's World Wide Name (WWN) and discover the WWNs of the storage array's ports P1-n. Additionally, the hosts 126a-n can use Multi-Path I/O (MPIO) techniques to establish optimal paths (e.g., the paths 305a-n) via the network nodes 205a-n of FIG. 2 based on metrics such as bandwidth, latency, and error rates. Further, the HBAs 302a-n can continuously monitor the paths 305a-n for performance using MPIO techniques to adapt to network conditions dynamically, ensuring efficient and reliable data transfer between the hosts 126a-n and the storage array 102. For example, the HBAs 302a-n can include MPIO logic and hardware that handle path selection and can dynamically switch between paths in case of path failure or degradation, ensuring continuous availability and load balancing.

In embodiments, the storage array 102 can include a controller 142 that monitors the health and performance of the established paths 305a-n. Suppose a path becomes unreliable or "flaky" due to issues like degraded laser diodes in the network's fiber optics. In that case, the controller 142 can detect this based on error rates or response times. Upon detecting path issues, the controller 142 can reroute IO operations to healthier paths, and in advanced setups, it might even inform the hosts 126a-n or network components to adjust settings or trigger alerts.

In embodiments, the HBA 302b of the host 126b can initiate communications to port P2 of the storage array 102 via a path 305b through the SAN 118. In addition, the controller 142 can continuously monitor error rates on all the ports P1-n of the storage array 102. Suppose, for example, port P2 begins to show signs of degradation (e.g., failing IO operations), perhaps due to hardware issues like a failing laser diode, resulting in an increased error rate in IO operations. The controller 142 can identify a potential issue if the error rate on port P2 has exceeded a predefined threshold, indicating a potential issue with the port's reliability.

Once the error rate on port P2 crosses the threshold, controller 142 can flag it as "flaky." The "flaky" status can trigger the controller 142 to perform path management protocols to initiate corrective actions. For example, the controller 142 can log the issue and alert a storage administrator. The log can include detailed information about the error rates and specific issues detected at port P2. The controller 142 can also initiate a path rerouting process to mitigate the impact on data operations corresponding to the host 126b. Further, the controller 142 can evaluate other available ports (e.g., port P3) for their current load and error status.

In embodiments, the controller 142 can reduce the IO performance on port P2. For example, the controller 142 can increase the response times for IO operations on port P2, making it less attractive for the MPIO logic and hardware on the HBA 302b of the host 126b. In response to increasing the response times, the HBA 302b can detect the change in performance on port P2 and seek to optimize IO paths based on performance criteria. For instance, with port P2 having higher response times, the HBA 302b can reroute IO operations to port P3, which shows healthier performance metrics.

In embodiments, the controller 142 can determine that the HBA 302b of the host 126b is responsible for the flaky path 305b. Specifically, the controller 142 can continuously monitor error rates associated with each HBA 302b-n connected to ports P1-n. For instance, the controller can compare the error rates against a predefined HBA threshold. If the error rate exceeds the HBA threshold, the controller 142 can identify the HBA 302b as the cause of the flaky path 305b. To prevent data integrity issues and performance degradation, the controller 142 can redirect traffic away from the HBA 302b. For example, the controller can instruct the host 126b to reroute IO operations to an alternative HBA or path that is error-free.

Figure 4:
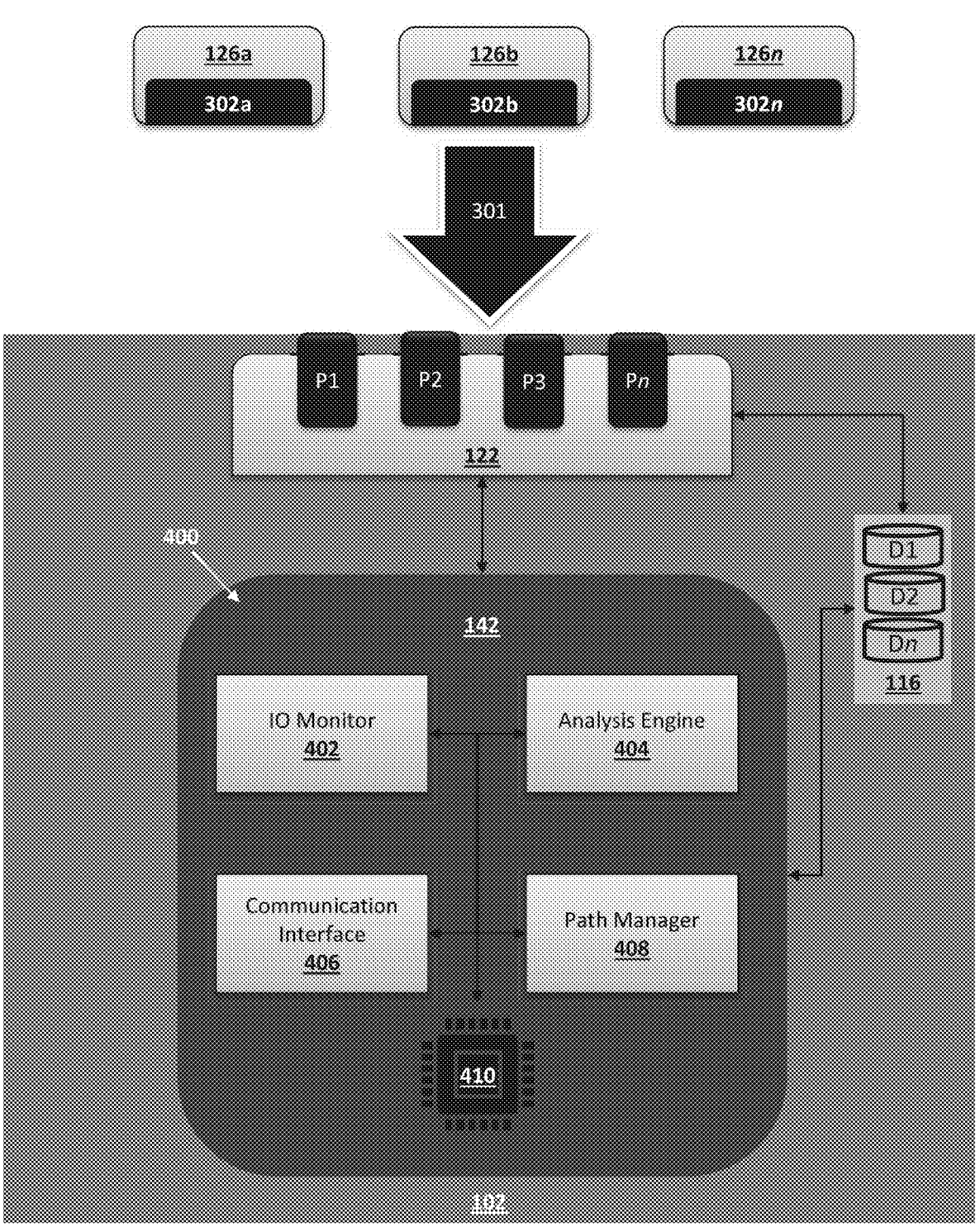
FIG. 4 is a block diagram of a controller in accordance with embodiments of the present disclosure.

Regarding FIG. 4, a storage array 102 can include a controller 142 that serves as a central intelligence unit responsible for managing and optimizing data flow (e.g., IO workloads 301) between hosts 126a-n and storage media D1-n of the storage array's persistent storage 116. It is designed to ensure high availability, reliability, and efficiency in the storage array's operations. The controller 142 achieves these objectives through real-time monitoring, analysis, decision-making, and dynamic adjustment of data paths (e.g., the paths 305a-n of FIG. 3) and system components (e.g., the components 108 of FIG. 1).

Equipped with advanced hardware, logic, and circuitry components 400, the controller 142 continuously assesses the health and performance of all communication paths, including those facilitated by Host Bus Adapters (HBAs) 302a_n and array ports P1-n. It utilizes sophisticated techniques to detect anomalies, errors, and performance degradation that could impact system operations. Upon detecting potential issues, the controller 142 proactively initiates corrective actions to reroute IO operations, adjust system settings, or perform necessary remediations to maintain optimal performance and data integrity.

In embodiments, the controller 142 can include an IO monitor 402 designed to continuously oversee the operational health and performance of all communication paths (e.g., the paths 305a-n of FIG. 3) between the storage array 102 and connected hosts 126a-n. The IO monitor 402 operates by collecting a wide range of data metrics related to the input/output (IO) operations, e.g., in an IO workload 301 processed through the storage array's ports P1-n and connected Host Bus Adapters (HBAs) 302a-n of corresponding hosts 126a-n.

In embodiments, the IO monitor 402 can include sensors and detectors (not shown) that continuously scan the ports P1-n for any signs of malfunction or degradation, enabling immediate detection of potential issues. For example, the IO monitor 402 continuously monitors all IO operations received at each port P1-n of the storage array 102. This includes tracking the number of failing IO operations, which could indicate a problem in a communication path (e.g., one of the paths 305a-n of FIG. 3). Specifically, the IO monitor 402 aggregates error counts not just per host but across all hosts connected to a specific port, providing a comprehensive view of port health. Further, the IO monitor 402 can maintain a log of data corresponding to the monitored metrics of the IO operations in a local memory 410.

In embodiments, the controller 142 can include an analysis engine 404 that analyzes the data logs (e.g., real-time and historical data) from the local memory 410 to identify patterns or conditions that exceed predefined thresholds. Based on this analysis, the analysis engine 404 determines the health status of the ports P1-n and HBAs 302a-n. Additionally, the analysis engine 404 compares real-time data from the data logs against established error and performance thresholds to identify flaky paths. Further, the analysis engine 404 determines whether issues are related to specific ports P1-n, HBAs 302a-n, or broader system components.

For example, the analysis engine 404 can define thresholds for acceptable error rates at the port and individual Host Bus Adapter (HBA) levels connected to the hosts 126a-n. When the number of errors on a port or an HBA exceeds these thresholds, the analysis engine 404 identifies this as a potential issue needing intervention. Upon detecting excessive errors, the analysis engine 404 identifies the problematic component, whether it's one of the ports P1-n itself or a specific HBA 302a-n causing the errors. The analysis engine 404 can also generate alerts that include detailed information about the nature of the flakiness and the affected components.

In embodiments, the controller 142 can include a communication interface 402 that facilitates communications between the storage array 102 and connected hosts 126a-n. Specifically, the communication interface 402 can send alerts and health status updates and receive commands from hosts 126*a-n* or administrators. In addition, the communication interface 402 can manage various communication protocols such as Fibre Channel, ISCSI, or vendor-specific commands.

In embodiments, the communication interface 402 can require the hosts 126*a-n* to poll the storage array 102 at regular intervals (e.g., every minute) to receive updates on port health, which helps in proactive management of the communication paths between the HBAs 302*a-n* and the storage array's ports P1-n. For example, the communication interface 402 can implement enhanced communication protocols with the hosts 126*a-n*. The communication protocols can cause the hosts 126*a-n* to issue vendor-specific commands, mode sense, or log sense commands to receive the health status of the ports P1-n.

In embodiments, the controller 142 can include a path manager 408 that manages the routing of IO operations, dynamically rerouting data from problematic paths to maintain system performance and data integrity. The path manager 408 can use advanced routing algorithms to determine the optimal paths for data flow based on current system health and load balancing requirements. In addition, the path manager 408 can adjust path properties such as bandwidth allocation and response time to influence path selection by host MPIO systems.

For example, the path manager 408 can dynamically redirect IO operations away from problematic paths. Suppose, for example, a port (e.g., port P1) is identified as flaky, the path manager 408 can reduce the IO performance of that port. By reducing the IO performance of the port, the path manager 408 can influence MPIO components on the hosts 126*a-n* to reroute traffic to healthier, alternative paths associated with one or more different ports (e.g., ports P2-n).

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Regarding FIG. 5, a method 500 relates to dynamically managing input/output (IO) paths in a storage network environment. In embodiments, the controller 142 of FIG. 1 can perform all or a subset of operations corresponding to the method 500.

For example, the method 500, at 502, can include monitoring input/output (IO) operations received at a port of a storage array. For example, the storage array can receive the IO operations from one or more hosts (e.g., the hosts 106 of FIG. 1). Additionally, at 504, the method 500 can include determining the number of failing IO operations at the port of the storage array. Further, the method 500, at 506, can include identifying an error in a communication path between the port of the storage array and at least one of the one or more hosts based on the number of failing IO operations. Moreover, at 508, the method 500 can include redirecting IO operations from the communication path with the error to an alternative communication path free from errors.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the steps of the method. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer with a display device enabling user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). For example, input from the user can be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer with a graphical user interface, a web browser through which a user can interact with an example implementation or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise when computer programs run on the respective computers and have a client-server relationship. Further, the system can include a storage array(s) that delivers distributed storage services to the client(s) or server (s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (PDA) device, laptop computer, electronic mail device), or other communication devices. The browser device includes, for example, a computer (e.g., desktop computer, laptop computer) with a World Wide Web browser (e.g., Microsoft® Internet Explorer® and Mozilla®). The mobile computing device includes, for example, a Blackberry®.

Comprise, include, or plural forms of each are openended, include the listed parts, and contain additional unlisted elements. Unless explicitly disclaimed, the term 'or' is open-ended and includes one or more of the listed parts, items, elements, and combinations thereof.

What is claimed is:

1. A method comprising:
monitoring input/output (IO) operations received at a port of a storage array, wherein the IO operations are received from one or more hosts;
determining a number of failing IO operations at the port of the storage array by aggregating IO error data across all of the one or more hosts connected to the port;
identifying an error in a communication path between the port of the storage array and at least one of the one or more hosts based on the number of failing IO operations; and
redirecting IO operations from the communication path with the error to an alternative communication path free from errors by increasing response times for IO operations received at the port of the storage array, wherein the increased response times reduce an attractiveness of the port to host-side multi-path IO (MPIO) logic and cause the one or more hosts to naturally select alternative communication paths.

2. The method of claim 1, further comprising:
determining if the number of failing IO operations exceeds a port-level threshold.

3. The method of claim 1, further comprising:
determining a number of failing IO operations per Host Bus Adapter (HBA) corresponding to each of the one or more hosts.

4. The method of claim 3, further comprising:
determining a source of the error as a subject HBA if the number of failing IO operations of the subject HBA exceeds an HBA threshold.

5. The method of claim 4, further comprising:
determining the source of the error as the port of the storage array if the number of failing IO operations exceeds a port-level threshold and the number of failing IO operations per HBA fails to exceed the HBA threshold.

6. The method of claim 1, further comprising:
causing the one or more hosts to poll the port of the storage array at regular intervals to receive a health status of the port.

7. The method of claim 6, further comprising:
causing the one or more hosts to use a vendor unique (VU), mode sense, or log sense command to poll the port of the storage array.

8. The method of claim 1, further comprising:
reducing an IO performance of the port of the storage array to redirect IO operations to another port of the storage array.

9. The method of claim 8, further comprising:
increasing response times for IO operations received at the port of the storage array having the reduced IO performance to reduce the IO performance.

10. The method of claim 8, further comprising:
causing at least one of the one or more hosts to load balance IO operations to the another port of the storage array by reducing the IO performance of the port of the storage array.

11. An apparatus with a memory and processor, the apparatus configured to:
monitor input/output (IO) operations received at a port of a storage array, wherein the IO operations are received from one or more hosts;
determine a number of failing IO operations at the port of the storage array by aggregating IO error data across all of the one or more hosts connected to the port;
identify an error in a communication path between the port of the storage array and at least one of the one or more hosts based on the number of failing IO operations; and
redirect IO operations from the communication path with the error to an alternative communication path free from errors by increasing response times for IO operations received at the port of the storage array, wherein the increased response times reduce an attractiveness of the port to host-side multi-path IO (MPIO) logic and cause the one or more hosts to naturally select alternative communication paths.

12. The apparatus of claim 11, further configured to:
determine if the number of failing IO operations exceeds a port-level threshold.

13. The apparatus of claim 11, further configured to:
determine a number of failing IO operations per Host Bus Adapter (HBA) corresponding to each of the one or more hosts.

14. The apparatus of claim 13, further configured to:
determine a source of the error as a subject HBA if the
number of failing IO operations of the subject HBA
exceeds an HBA threshold.

15. The apparatus of claim 14, further configured to:
determine the source of the error as the port of the storage
array if the number of failing IO operations exceeds a
port-level threshold and the number of failing IO
operations per HBA fails to exceed the HBA threshold.

16. The apparatus of claim 11, further configured to:
cause the one or more hosts to poll the port of the storage
array at regular intervals to receive a health status of the
port.

17. The apparatus of claim 16, further configured to:
cause the one or more hosts to use a vendor unique (VU),
mode sense, or log sense command to poll the port of
the storage array.

18. The apparatus of claim 11, further configured to:
reduce an IO performance of the port of the storage array
to redirect IO operations to another port of the storage
array.

19. The apparatus of claim 18, further configured to:
increase response times for IO operations received at the
port of the storage array having the reduced IO perfor-
mance to reduce the IO performance.

20. The apparatus of claim 18, further configured to:
cause at least one of the one or more hosts to load balance
IO operations to the another port of the storage array by
reducing the IO performance of the port of the storage
array.

\* \* \* \* \*